CONCENTRATES OR GROUND ORE

STEP 1 (a) MIX WITH FLUORINE COMPOUND (b) MIX WITH SULPHURIC ACID AND FILTER WASHINGS

2 BAKE OR ROAST

SOLUBLE VANADIUM SALTS — VOLATILE EXCESS ACID (a)

SCRUBBER {STEAM / WATER} (b)

3 LEACH WITH WATER AND FILTER WASHINGS AND HEAT

FILTER

VANADIUM ETC. SULPHATES — INSOLUBLE GANGUE, LEAD, BARIUM, SILICA ETC.

4 (a) ADD IRON (b) FILTER

SOLUBLE VANADIUM, PHOSPHOROUS ETC. — INSOLUBLE COPPER AND ARSENIC 5 (a) ADD SODIUM CARBONATE OR CAUSTIC SODA AND HEAT (b) FILTER

FERROUS VANADATE — SOLUBLE {FERROUS SULPHATE / SODIUM SULPHATE}

6 (a) DRY AND MIX WITH SODIUM CHLORIDE OR CARBONATE (b) ROAST OR FUSE (c) LEACH WITH WATER (d) FILTER

SOLUBLE VANADIUM, PHOSPHOROUS ETC. SALTS. INSOLUBLE IRON OXIDES (e) ADD SODIUM ALUMINATE OR ALUMINUM SALT AND HEAT (f) ADD ACID TILL ALMOST NEUTRAL (g) FILTER

SOLUBLE SODIUM VANADATE — INSOLUBLE ALUMINUM AND PHOSPHOROUS SALTS (h) ADD FERROUS SULPHATE, NEUTRALIZE AND HEAT (i) FILTER

INSOLUBLE PURE FERROUS VANADATE — SOLUBLE SODIUM SALTS (j) DRY AND FUSE

HIGH GRADE "OXIDE" FREE FROM COPPER ARSENIC AND PHOSPHOROUS.

UNITED STATES PATENT OFFICE.

LOUIS F. VOGT, OF WASHINGTON, PENNSYLVANIA.

TREATMENT OF VANADIUM ORE.

1,129,253.      Specification of Letters Patent.      Patented Feb. 23, 1915.

Application filed November 26, 1913. Serial No. 803,172.

*To all whom it may concern:*

Be it known that I, LOUIS F. VOGT, of Washington, in the county of Washington and State of Pennsylvania, have invented certain new and useful Improvements in Treatment of Vanadium Ore; and I do hereby declare the following to be a full, clear, and exact description of the invention, such as will enable others skilled in the art to which it appertains to make and use the same.

This invention relates to the treatment of ore, particularly such as contain vanadium.

One object of my invention is to provide a process which will insure the efficient breaking up of the silicious materials of the raw ore so as to effect a more complete separation of vanadium content therefrom.

A further object is to so conduct the process as to reduce to a minimum the loss and waste of solvents and reagents used in the reduction steps.

A further object is to effectually free the vanadium extracts from arsenic, phosphorus, copper and other metals with which they may be associated.

A further object is to provide a process which will result in the efficient extraction of vanadium, generally in the form of commercially pure ferrous vanadium oxid, from impure and low grade ores and at a low cost.

With these objects in view, the invention consists in certain novel steps in the treatment of vanadium bearing ores as hereinafter set forth and pointed out in the claims.

The accompanying drawing is a diagrammatical or chart view illustrating my improved process.

Outlined generally my process consists in first mixing the vrushed ore, either alone or with the addition of a certain amount of fluorin bearing compounds, with sulfuric acid and filter washings, to form a thick paste; second, allowing this paste to stand for a considerable period to secure an intimate association and co-action of the mixed materials and then applying heat to complete the reaction and drive off both the volatile products and most of the excess of acid; third, then digesting the acid residue in water with or without the assistance of steam heat to dissolve out the vanadium content; fourth, then treating the solution so obtained with iron for the separation of the copper and arsenic; fifth, then precipitating the vanadium in the form of ferrous vanadate, and treating the precipitates, if necessary, for the removal of the phosphorus; and sixth, roasting the purified ferrous vanadate to reduce it to a ferrous vanadium oxid thereby increasing its vanadium content by breaking up the hydroxals of the ferrous vanadate.

In this process various novel methods are employed in connection with the different steps for the more complete recovery of the vanadium content of the ores and the extracts therefrom; and for the saving of the by-products and excess of acid employed in the initial steps of the operation; which will be more fully described hereafter.

In the practice of my invention—as thus generally outlined—the raw vanadium ores are first crushed as usual, and if necessary subjected to a water or other form of concentration to remove any excess of lighter gangue or silicious body. The crushed ore or the concentrates derived therefrom are then mixed with crude sulfuric acid and water to form a thick paste; a certain amount of the filter washings obtained in the third and fourth steps of the process being sometimes added to the mixture for a purpose hereinafter described. I also preferably add to the paste a certain amount of mineral containing fluorin such as fluorspar or cryolite or other fluorin bearing compound. The object of this addition is to aid the decomposition of the ore by the generation of hydrofluoric acid produced by the action of the sulfuric acid on the fluorids which in turn attacks and breaks up the silicates or silicious matter of the acidulated ore paste or mixture; thus setting free inclosed or combined portions of the vanadium compounds which would not otherwise be acted on by the sulfuric acid. The addition of fluorin bearing minerals is especially advantageous in treating hard silicious ores, as it renders fine pulverization of such ores unnecessary, and effects in fact a much more complete breaking up of said ores, and a much more complete freeing of the vanadium content thereof than can be effected in any other way.

Instead of adding fluor-spar or cryolite or similar fluorin compounds to the acidulated paste, as above described, I may in some cases, add them to the crushed vanadium ores or concentrates before the latter are mixed with the sulfuric acid and filter washings. In such cases the dry mixtures or ores and fluorin bearing minerals may be treated, as a preliminary step, by adding crude acid to the mixture or by moistening the mass and exposing it to the action of acid fumes of any suitable character,—such for example as those driven off during the second step of my regular process—or in any other way which will result in the decomposition of the fluorin compounds and the generation of hydrofluoric acid. Or such generation may be effected in a separate receptacle and the acid there formed conducted into the vanadium ore mass.

*Second step.*—The mixture or paste of vanadium bearing material and sulfuric acid—either with or without the addition of fluorin bearing compounds—is allowed to stand or digest and slowly disintegrate, until the reaction between the acid and the vanadium compound has proceeded as far as it will without the application of heat. The pasty mixture of sulfates, ore residue and acid is then charged into a furnace, or other suitable appliance, and subjected to sufficiently intense and sufficiently long continued heat to complete the reaction between the vanadium and other metals in the mass and the sulfuric acid, and also to drive off the volatile constituents of the ore residue. The heating is continued until most, but not all, of the residual free acid has also been driven off; the amount of free acid content left being determined by the original composition of the ore, and the resultant nature and amount of the impurities to be removed in subsequent stages of the operation.

In order to recover the acid which is driven off during the latter stages of the roasting operation the fumes or stack gases, which contain the excess of acid, largely in the form of sulfuric anhydrid, are led through coke towers or other suitable form of scrubber, containing low pressure steam jets or sprays of water. The sulfuric anhydrid is thus once more converted to sulfuric acid, which can be used again in the treatment of a fresh mass of vanadium ore. Or in some cases a portion of the stack fumes, containing the sulfuric anhydrid fumes may be directly utilized, as already explained, in the preliminary treatment of the mixed mass or ore and fluorin bearing material. In any case the recovery of the sulfuric acid or sulfuric anhydrid fumes by one or the other of the above described operations is very desirable and important as it effects a large daily saving in acid consumption, and thus considerably reduces the cost of my improved process of vanadium ore treatment.

*Third step.*—The roasted cake of crust obtained in the second step is next digested, boiled, or lixiviated with water, or with the filter washings, with or without the assistance of steam as required, until the crust has been disintegrated and the vanadium and the soluble metallic salts formed in the first two steps of the operation together with the unvolatilized excess of sulfuric acid, has been dissolved out. The acid liquor thus obtained contains the vanadium and other metals as sulfates or a solution of the oxids in sulfuric acid; and the residual sludge contains the waste mineral or gangue of the ore. The liquor and sludge are separated from one another by decantation, or by filtering or filter pressing or in any other suitable manner, and the filter residue or waste sludge is washed repeatedly with warm acidulated water to free it from all soluble vanadium content. The first filter washings are added to the vanadium filtrate liquor, and the final diluted washings are stored separately for use with the sulfuric acid in the first step treatment of a fresh body of vanadium ore, as already described. This manner of handling the filter washings or wash water insures the complete and effective washing of the filter residue or sludge, avoids undue dilution of the main filtrate liquor, obviates any necessity for evaporating or concentrating the filter washings to small volume to enable them to be used, and thus effects a very decided economy in the operation.

*Fourth step.*—The filtrate obtained in the third step contains, as already pointed out, a considerable excess of free sulfuric acid. The next step in my improved operation is to heat this liquor and add to it a sufficient amount of iron to precipitate the copper and arsenic. The amount of iron added depends of course on the percentage composition of the filtrate. In the case of the ore which I am now treating by my improved process I find that it is desirable to add about two parts of iron for each part—by weight—of vanadium contained in the filter solution. The treating or roasting which form a part of the second step of my process must also be controlled and governed by the composition of the ore in such manner that after sufficient iron has been added to precipitate the copper and arsenic as just described the filter liquor will still contain at least 5 per cent. of free acid. Under such circumstances the addition of the iron precipitates first the copper and then the arsenic in the form of a sludge, and reduces the vanadium present to a lower oxid salt which is still retained in solution by the presence of the free acid. The vanadium liquor is then separated from the copper arsenic sludge precipitate by decantation or filtering or filter pressing, the filter sludge being well washed as before with warm acidulated water to free it as far as possible from soluble vanadium salts. The filter washings are preferably separated and used in the same way as those obtained in the third step of my operation. The washed copper sludge forms a marketable commercial product which may be treated for the recovery of copper.

*Fifth step.*—The filtrate or filter liquor obtained in the fourth step is next heated to boiling and a dilute solution of soda ash or caustic soda is slowly added with constant stirring until a sufficient amount of alkali has been introduced to neutralize practically all of the residual free acid in the filtrate. When this has been done the vanadium content of the filter liquor is precipitated along with a portion of the iron added in the preceding step as ferrous vanadate. When this action is complete, as determined by suitable control tests, the ferrous vanadate sludge or precipitate is separated from the solution by decantation or filtration as in previous operations, and is washed free from the soluble sulfates and sulfur compounds. It is then dried and set aside for subsequent treating the character of which is determined by the original constitution of the ore.

*Sixth step.*—(*a*) If the ore treated is reasonably free from phosphorus, or if so little phosphorus is contained in the vanadium precipitate obtained in step 5 as to make its removal unnecessary, the washed and dried ferrous vanadate is next ignited and roasted and thereby converted into a mixture of iron and vanadium oxid suitable for use in the preparation of ferro vanadium or other purposes. (*b*) But if the vanadate precipitate contains an objectionable amount of phosphorus I first treat it to remove the phosphorous salts. As a first step in this sub-operation I roast or fuse the dry and finely divided vanadium compound obtained in step 5 with common salt (sodium chlorid with the addition of sodium or potassium nitrate, and soda ash) sodium carbonate if required. The amount of alkali used varies somewhat with the composition of the ores—and the resultant composition of the ferrous vanadate—but sufficient should be used in all cases to obtain practically all of the vanadium in the form of sodium vanadate. In the treatment of the particular ore with which I am now working I have found, for example, that about 15 parts of salt for every 4 parts by weight of vanadium gives good results. The phosphorus present is also converted into soluble sodium phosphate. The roasted mass is then, if necessary, ground or pulverized and is next digested with hot water (*e*), which dissolves out the vanadates and phosphates; (*d*) and the insoluble residue—consisting mostly of iron oxid—is filtered off. The filtrate will be more or less alkaline. Add to the filtrate sufficient of a solution of aluminum or aluminum salt, (*e*), such as sodium aluminate, to precipitate the phosphorus contained in the filtrate, which phosphorus will separate as aluminum phosphate upon the addition of sufficient acid (*f*) to nearly neutralize the solution. This precipitate is separated as before by decantation or filtration (*g*). The filtrate liquor and filter washings, which contain most of the vanadium, is heated to boiling and sufficient of the filtrate liquor obtained in step 5—which contains a large proportion of ferrous sulfate—is added (*h*) to once more precipitate the vanadium as ferrous vanadate. In this operation care must be taken to avoid any acidity of the solutions and if such acidity exists it must be neutralized by the addition of soda ash or caustic soda solution. The ferrous vanadate precipitate is then separated from the solution by decantation or filtration (*i*), as before, washed, dried and ignited (*j*) to convert it into iron and vanadium oxids.

In the precipitation of the phosphorus as aluminum phosphate a small amount of vanadium may be carried down and retained with the phosphorus precipitate. If there is sufficient vanadium so retained to warrant recovery, the washed precipitate is refused with salt and the product of the refusion, redissolved and retreated just as described in the preceding paragraph. The second aluminum phosphate filtrate is then added to the first, or treated separately as before with the ferrous sulfate filtrate liquor obtained in step 5, to precipitate the vanadium as ferrous vanadate.

The advantages of my improved process for the treating of vanadium ores,—particularly those difficult of reduction by ordinary processes,—will now be readily understood by those skilled in the art; to whom it will be obvious also that various detail modifications may be made in the operations above specifically described without departing from the substance of my invention.

What I claim as new, and desire to secure by Letters-Patent is:—

1. The process of extracting vanadium from its ores which consists in treating the ore with an excess of sulfuric acid, roasting the aciduated mass until most but not all of the acid excess has been driven off, digesting the roasted mass with water to obtain an acid solution of the vanadium and metal salts formed by the action of the sulfuric acid, adding iron to said acid solution to precipitate copper and arsenic, and then neutralizing the excess of acid in the filtrate to precipitate the vanadium in the form of ferrous vanadate, substantially as described.

2. The process of extracting vanadium from its ores consisting in treating the ore with an excess of sulfuric acid to form sulfates, roasting the treated mass until most but not all of the uncombined acid has been driven off, dissolving out the soluble sulfates and the rest of the acid from the roasted mass, adding iron to the acid solution to precipitate copper arsenic, and then neutralizing the excess of acid in the filtrate to precipitate ferrous vanadate from the same, substantially as described.

3. The process of extracting vanadium from its ores consisting in first mixing the ore with an acid compound capable of breaking up the silicates and silicious matter in the ore, then subjecting the mixture to the action of heat to drive off most but not all of the uncombined acid, then treating the roasted mass with water to obtain an acid solution of the vanadium and other soluble sulfates, then adding iron to this solution in sufficient quantity to precipitate the copper and arsenic, and then adding an alkali, to neutralize the remaining free acids in the filtrate and precipitate ferrous vanadate therefrom, substantially as described.

4. In a process of extracting vanadium, the sub-process consisting in roasting or fusing ferrous vanadate precipitate containing phosphorus with salt thereby converting the vanadium and phosphorus content of the precipitate into soluble sodium compounds, next dissolving out the soluble compounds and adding aluminum salt to the solution to precipitate phosphorus therefrom in the form of aluminum compounds, and finally precipitating vanadium from the filtrate by adding ferrous sulfate thereto.

5. The process of extracting vanadium from ores containing a high percentage of phosphorus which consists in first treating the ore so as to obtain the vanadium therefrom in the form of ferrous vanadate, then fusing said vanadate with common salt so as to convert the ferrous vanadate and the phosphorus salts mixed therewith into soluble sodium vanadate and sodium phosphate, then extracting said soluble sodium salts from the roasted mass by digestion with hot water, then in the solution so obtained precipitating the phosphorus therefrom by adding an aluminum salt solution, and then treating the sodium vanadate filtrate with a solution of ferrous sulfate to precipitate the vanadium in the form of ferrous vanadate, substantially as described.

In testimony whereof, I have signed this specification in the presence of two subscribing witnesses.

LOUIS F. VOGT.

Witnesses:
O. J. TURNER,
JOHN F. CARMICHAEL.